C. W. SCHULTZ & E. A. SWEENEY.
VEHICLE SEAT BACK SPRING.
APPLICATION FILED JULY 5, 1910.
999,677.
Patented Aug. 1, 1911.
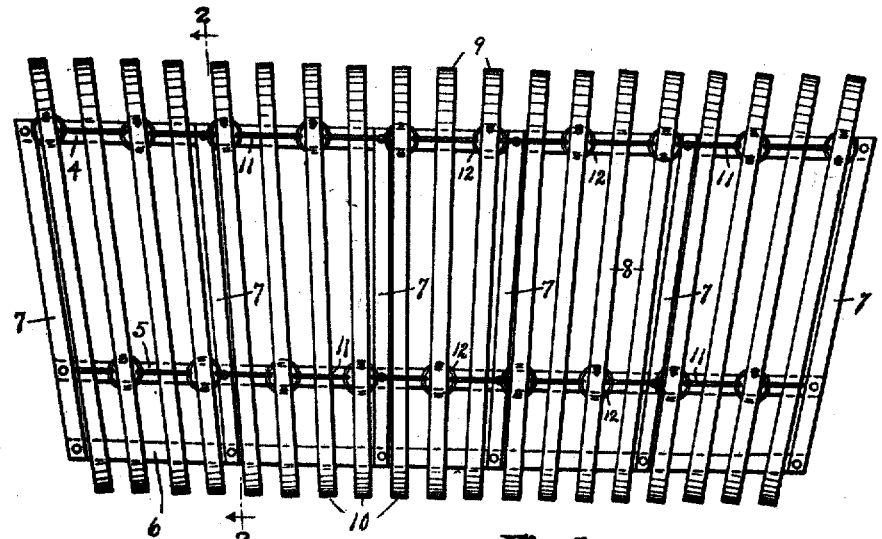
Fig. 1.
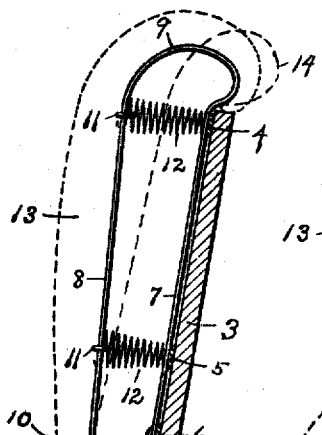
Fig. 2.
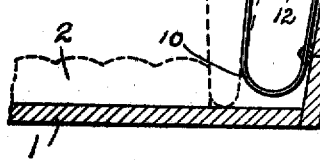
Fig. 3. Fig. 4.
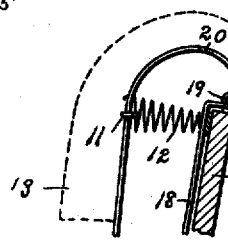 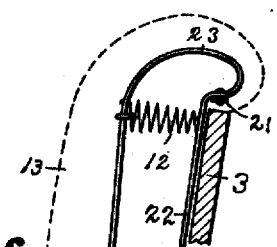
Fig. 5. Fig. 6.
Witnesses
Albert A. Hofmann.
Elizabeth M. Brown.
Inventors
C. W. Schultz and E. A. Sweeney.
By Edward N. Pagelsen,
Attorney

UNITED STATES PATENT OFFICE.

CHARLES W. SCHULTZ AND EDWARD A. SWEENEY, OF DETROIT, MICHIGAN.

VEHICLE SEAT-BACK SPRING.

999,677. Specification of Letters Patent. Patented Aug. 1, 1911.

Application filed July 5, 1910. Serial No. 570,251.

*To all whom it may concern:*

Be it known that we, CHARLES W. SCHULTZ and EDWARD A. SWEENEY, citizens of the United States, residing at Detroit, in the county of Wayne and State of Michigan, have invented a new and Improved Vehicle Seat-Back Spring, of which the following is a specification.

This invention relates to seat-back springs for vehicles, especially for automobile tonneaus, and the object of this construction is to provide means whereby particularly the upper part of the seat-back shall be rendered soft and resilient.

In the accompanying drawings Figure 1 is a front elevation of a complete set of springs for an automobile tonneau seat-back. Fig. 2 is a cross-section on the line 2—2 of Fig. 1. Figs. 3 to 6 inclusive illustrate slight modifications which can be made in the construction of the device.

Similar reference characters refer to like parts throughout the several views.

The back-cushions of automobile tonneaus and other vehicles are usually formed by building up a thick pad of horse-hair, moss, or other somewhat resilient fibrous material, covering the same, and then tufting. These cushions are yieldable to a certain extent, but not sufficiently to be perfectly comfortable when riding at high speeds over any but the best roads. It has been found most desirable that especially those portions of the cushions of automobiles immediately back of the shoulders and upper part of the chest of the passengers should be yieldable and soft, and at the same time perfectly resilient, and that this is of greater moment than similar resiliency in the seat cushions.

In the accompanying drawings, 1 conventionally represents the seat, 2 the seat cushion and 3 the back of an automobile seat, which back may be of any desired height and inclination. The spring construction is first assembled and then secured in position to the back. It consists, as shown in Figs. 1 and 2, of a frame formed of horizontal bars 4, 5 and 6, and uprights bars 7 which position the longitudinal bars and are secured thereto. Flat springs of thin spring-steel, generally C shaped, consisting of the fronts 8, upper curves 9 and lower curves 10, extend from the bars 4 to the bars 6, overhanging the rear side of the frame, and may be reinforced by any desired number of spiral springs 12. The spiral springs 12, are secured to the fronts 8 either near their upper or lower section, and are staggered, so that each front 8, has only one spring 12, either at the top or bottom. The upper and the lower row of springs 12, are connected by means of a series of separate ties 11, which pass over and across the outer side of the adjacent front 8, as shown in Fig. 1. By means of this construction, it will be readily seen that the number of springs 12 for a given length of back, is reduced to a minimum and at the same time the yielding of a spring 12 is communicated to and resisted or taken up by the adjacent front 8; through the tie 11, this action being the same and simultaneous at both the lower and the upper sections of the fronts 8. From this construction and arrangement it will be seen the springs 12, ties 11, and fronts 8 mutually coöperate with one another in uniformly and quickly distributing the shock over a large section and number of the resilient elements comprising the seat back. If desired, these springs 12 may be omitted. Any sudden jolt, such as may be caused by a stone or a rut when the vehicle is traveling at high speed, is softened by the flat springs yielding until they reach about the position shown by the dotted line 14 in Fig. 2. A pad 13 of any desired material and thickness will be secured over the springs as indicated in Fig. 2.

In Fig. 4 the upright bars 15 support a rod 16 to which the upper ends of the flat springs 17 connect after forming a portion of a spiral. In Fig. 5, the bars 18 are bent and carry the rod 19, which supports the ends of the springs 20, at their outer ends. Fig. 6 shows this rod 19 replaced by a flat bar 21, the upright bars 22 and springs 23 remaining much the same. For a cheaper construction, the fronts 8 and lower curves 10 of the flat springs may be replaced by flat straps of mild steel 24 which connect to the upper curves 25 at 26 as shown in Fig. 3. The efficiency of this construction will, of course, be slightly less than that shown in Figs. 1 and 2. Many other changes in the details of construction can be made by those skilled in the art without departing from the spirit of our invention.

Having now explained our construction, what we claim as our invention and desire to secure by Letters Patent is:—

A vehicle seat-back-spring, comprising a frame formed of longitudinal and upright rods secured together, a series of separated and upwardly extending resilient members having their lower ends curved inwardly and upwardly and connected to the lower portion of the frame and their upper ends extending upwardly, rearwardly, and downwardly to points of connection with the upper portion of the frame, coil springs connected to said frame and to the resilient members and alternately arranged near the top and bottom of adjacent resilient members respectively, and ties extending transversely between and connecting adjacent coil springs and in front of and bearing upon the intermediate resilient member.

In testimony whereof we have signed this specification in the presence of two subscribing witnesses.

CHARLES W. SCHULTZ.
EDWARD A. SWEENEY.

Witnesses:
ADAM E. BLOOM,
EDWARD N. PAGELSEN.